US012781954B2

(12) United States Patent
Liu et al.

(10) Patent No.: US 12,781,954 B2
(45) Date of Patent: *Nov. 3, 2026

(54) ILLUMINATED BATH CADDY

(71) Applicant: Kohler Co., Kohler, WI (US)

(72) Inventors: Xinyao Liu, Wauwatosa, WI (US); Han Chew, Shanghai (CN)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/184,361

(22) Filed: Apr. 21, 2025

(65) Prior Publication Data

US 2025/0251122 A1 Aug. 7, 2025

Related U.S. Application Data

(63) Continuation of application No. 18/662,762, filed on May 13, 2024, now Pat. No. 12,297,994, which is a (Continued)

(51) Int. Cl.

*F21V 33/00* (2006.01)
*A47K 3/28* (2006.01)
*F21S 9/02* (2006.01)

(52) U.S. Cl.

CPC ............ *F21V 33/004* (2013.01); *A47K 3/281* (2013.01); *F21S 9/02* (2013.01)

(58) Field of Classification Search

CPC ........... F21V 33/004; A47K 3/281; F21S 9/02
See application file for complete search history.

(56) References Cited

U.S. PATENT DOCUMENTS

| | | |
|---|---|---|
| 3,239,850 A | 3/1966 | Kiss |
| 5,761,753 A | 6/1998 | Talbert |

(Continued)

FOREIGN PATENT DOCUMENTS

| | | |
|---|---|---|
| CN | 202843442 | 4/2013 |
| DE | 20 2004 018 797 U1 | 3/2005 |

(Continued)

OTHER PUBLICATIONS

Final Office Action on U.S. Appl. No. 17/667,047 DTD Aug. 1, 2023.

(Continued)

*Primary Examiner* — Thomas M Sember
(74) *Attorney, Agent, or Firm* — Foley & Lardner LLP

(57) ABSTRACT

One aspect of the present disclosure relates to a bath caddy for use on a bathtub, where the bath caddy includes a tray having a top surface and a bottom surface, and a lighting assembly configured to couple to the bottom surface of the tray. The lighting assembly includes at least one light fixture configured to provide light to an interior of the bathtub. Another aspect of the present disclosure relates to a bath caddy including a tray and a lighting assembly configured to couple to the tray, where the lighting assembly is configured to provide light to an interior of the bathtub. Then lighting assembly includes at least one light fixture and a controller operably coupled to the at least one light fixture, where the controller is configured to adjust at least one of a color, tone, or brightness of the at least one light fixture.

20 Claims, 7 Drawing Sheets

Related U.S. Application Data continuation of application No. 17/667,047, filed on Feb. 8, 2022, now Pat. No. 12,007,110.

(60) Provisional application No. 63/147,314, filed on Feb. 9, 2021.

(56) References Cited

U.S. PATENT DOCUMENTS

| | | | | |
|---|---|---|---|---|
| 6,539,561 | B2 | 4/2003 | Shimizu | |
| 6,752,517 | B2 | 6/2004 | Hildebrand et al. | |
| 6,936,978 | B2 | 8/2005 | Morgan et al. | |
| 2005/0184207 | A1 | 8/2005 | Bertram | |
| 2006/0278560 | A1 * | 12/2006 | Lee | A47G 23/06 206/557 |
| 2009/0103312 | A1 | 4/2009 | Batson | |
| 2009/0289577 | A1 | 11/2009 | Thursfield et al. | |
| 2011/0226635 | A1 | 9/2011 | Boiteau et al. | |
| 2020/0281297 | A1 | 9/2020 | Kaye et al. | |

FOREIGN PATENT DOCUMENTS

| | | |
|---|---|---|
| JP | 2000-116557 | 4/2000 |
| KR | 100842425 | 7/2008 |
| KR | 101764677 | 8/2017 |

OTHER PUBLICATIONS

Non-Final Office Action on U.S. Appl. No. 17/667,047 DTD Mar. 7, 2023.

Non-Final Office Action on U.S. Appl. No. 17/667,047 DTD Oct. 24, 2023.

Non-Final Office Action on U.S. Appl. No. 18/662,762 DTD Sep. 24, 2024.

Notice of Allowance on U.S. Appl. No. 17/667,047 DTD Feb. 9, 2024.

Notice of Allowance on U.S. Appl. No. 18/662,762 DTD Jan. 14, 2025.

* cited by examiner

ILLUMINATED BATH CADDY

CROSS-REFERENCE TO RELATED APPLICATIONS

This application is a continuation of U.S. patent application Ser. No. 18/662,762, filed May 13, 2024, which is a continuation of U.S. patent application Ser. No. 17/667,047, filed Feb. 8, 2022, which claims the benefit and priority to U.S. Provisional Application No. 63/147,314, filed Feb. 9, 2021, which are incorporated herein by reference in their entirety.

BACKGROUND

The present disclosure relates generally to the field of bath caddies, and more specifically to illuminated bath caddies for providing light within a bathing space.

Bath caddies are among a myriad of common bath accessories generally used to supplement a bathing experience. Often, bath caddies merely facilitate a user's access to one or more items that would ordinarily be inaccessible while bathing. Such items typically include reading materials, food, and drink. These traditional bath caddies do not, however, include customizable features to provide for a more relaxing and immersive environment.

Accordingly, it would be advantageous to provide an improved bath caddy that facilitates an immersive bathing experience that enables relaxation and pleasure.

SUMMARY

One aspect of the present disclosure relates to a bath caddy for use on a bathtub. The bath caddy includes a tray having a top surface and a bottom surface, and a lighting assembly configured to couple to the bottom surface of the tray. The lighting assembly includes at least one light fixture configured to provide light to an interior of the bathtub.

In various embodiments, the at least one light fixture extends along an edge of the tray. In some embodiments, the bath caddy further includes a first placement feature and a second placement feature, where each of the first placement feature and second displacement feature are disposed on and extending downwardly from the bottom surface of the tray, and where the first placement feature is configured to engage with a first wall and the second placement feature is configured to engage with a second wall of the bathtub. In other embodiments, the top surface of the tray includes at least one recessed region. In yet other embodiments, the at least one recessed region is configured as a slot. In various embodiments, the tray includes a rim disposed along a perimeter of the tray, where the rim extends upward from the top surface. In some embodiments, the lighting assembly is removably coupled to the bottom surface of the tray. In other embodiments, lighting assembly includes a first set of magnetic components and the bottom surface of the tray comprises a second set of magnetic components, where the first set of magnetic components is configured to couple to the second set of magnetic components. In yet other embodiments, the lighting assembly includes one or more protrusions extending upward from the lighting assembly. In various embodiments, the bottom surface of the tray includes one or more brackets, the one or more brackets configured to receive the one or more protrusions. In some embodiments, the bottom surface of the tray includes one or more recesses, the one or more recesses configured to receive the one or more protrusions.

Another aspect of the present disclosure relates to a bath caddy for use on a bathtub. The bath caddy includes a tray and a lighting assembly configured to couple to the tray, where the lighting assembly is configured to provide light to an interior of the bathtub. The lighting assembly includes at least one light fixture and a controller operably coupled to the at least one light fixture, where the controller is configured to adjust at least one of a color, tone, or brightness of the at least one light fixture.

In various embodiments, the controller is configured to adjust at least one of a color, tone, or intensity of the at least one light fixture based on a predetermined mode associated with the lighting assembly. In some embodiments, the predetermined mode corresponds to particular range of at least one of the color, tone, or intensity. In other embodiments, the predetermined mode corresponds to a particular duration associated with at least one of the color, tone, or intensity. In yet other embodiments, the predetermined mode corresponds to a particular sequence associated with the at least one of the color, tone, or intensity. In various embodiments, the lighting assembly further includes a user interface operably coupled to the controller, where the user interface is configured to send one or more inputs to the controller for controlling the at least one light fixture. In some embodiments, the user interface is disposed on a bottom surface of the tray. In other embodiments, the bottom surface of the tray includes a non-slip coating. In yet other embodiments, the user interface is disposed on a top surface of the tray.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
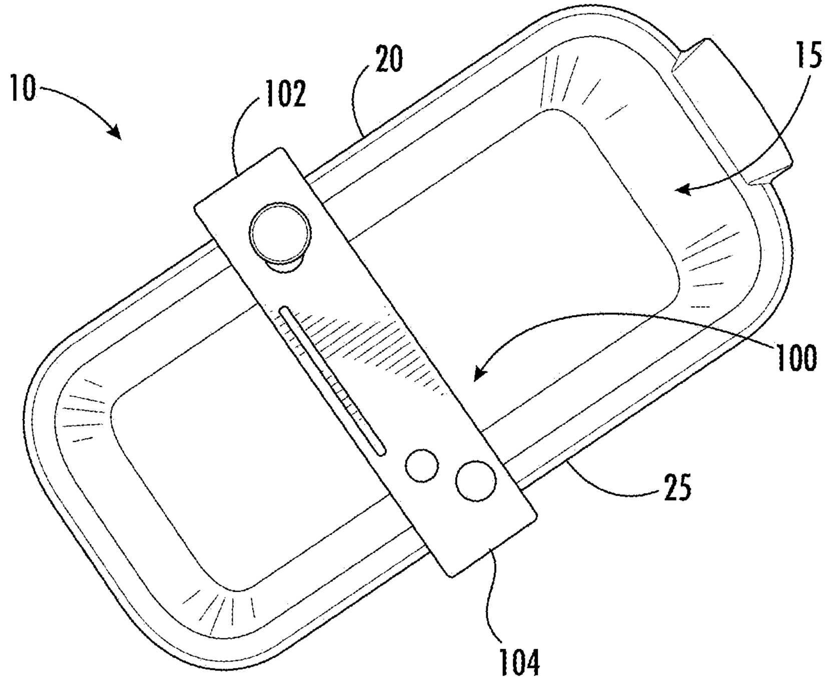
FIG. 1 is a top view of an illuminated bath caddy in a bathing environment, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

The present disclosure provides an illuminated bath caddy that enables controllable illumination of a bathing environment. Use of the illuminated bath caddy to illuminate a bathing environment may promote a relaxing and pleasurable bathing experience that includes sensory immersion without requiring complex bathing infrastructure. In particular, the illuminated bath caddy may not only facilitate a user's access to various accessories and bathing accompaniments, but may also enhance a user's mood by providing a relaxing ambiance that is customizable by a user.

One embodiment of the disclosure relates to an illuminated bath caddy configured to provide light within a bathing environment. In various embodiments, the bath caddy includes a tray having a top surface and a bottom surface, wherein the top surface may include one or more protruding structures configured to enable containment of items placed on the top surface. The tray may include fixtures to enable placement of the bath caddy on a bathtub within the bathing environment. The bottom surface may further include a lighting assembly. In various embodiments, the lighting assembly may include a controllable light fixture that is operably coupled to a user interface. The user interface may enable changing at least one of an intensity, tone, or color of light emitted from the light fixture.

In various embodiments, the user interface is coupled to a controller within the lighting assembly, which enables control of the light fixture. The user interface may include a power input, which is configured to turn the light fixture on or off. The user interface may further include one or more intensity inputs (e.g., plus or minus indicators) to facilitate changing a brightness, tone, and/or intensity of the light emitted from the light fixture. In various embodiments, the user interface may include selection inputs (e.g., arrows) to facilitate selecting or changing a tone or color of the light emitted from the light fixture. In various embodiments, the lighting assembly may further include a power source (e.g., battery), which is configured to power the lighting fixture and/or the controller and user interface.

In various embodiments, the lighting assembly is removably coupled to the bottom surface of the bath caddy tray. In various embodiments, the lighting assembly may include one or more magnetic components, wherein the magnetic components enable coupling of the lighting assembly to the bottom surface of the tray. In some embodiments, the lighting assembly may include one or more engaging components that are configured to engage with one or more receiving features within the bottom surface of the bath caddy tray. In various embodiments, at least one of the lighting fixture, power source, and user interface may be integrally formed within the bottom surface of the bath caddy tray.

In various embodiments, the lighting assembly may be configured to provide white light. In various embodiments, the lighting assembly may be configured to provide a full color spectrum of light.

In various embodiments, the controller within the lighting assembly may operate according to one or more predetermined modes, which may be chosen and/or modified using at least one of the power input, intensity inputs, or the selection inputs of the user interface. In various embodiments, the one or more predetermined modes may include warm or cool lighting options. In other embodiments, the one or more predetermined modes may be a color theme or journey.

Referring generally to the figures, an illuminated bath caddy may be configured to provide light within a bathing environment. The bath caddy may include a tray to facilitate storage and/or access to one or more items during bathing (e.g., food, drink, reading materials, bathing accessories, etc.). The tray may have a top surface and a bottom surface, where the top surface may include one or more protruding structures configured to enable containment of items placed on the top surface. The structures may include, but are not limited to, ridges or rims to prevent lateral movement of one or more items placed on the top surface of the tray. The top surface may additionally or alternatively include one or more recesses, which may be configured to contain items placed on the top surface of the tray. The tray may further include one or more fixtures to enable placement of the bath caddy on bathtub within the bathing environment. In various embodiments, the tray may include fixtures disposed on opposite ends of the tray, which may be configured to engage with opposite walls of a bathtub within a bathing environment.

The bottom surface of the illuminated bath caddy tray may further include a lighting assembly. In various embodiments, the lighting assembly may include a controllable light fixture that is operably coupled to a user interface. In various embodiments, the light fixture may include one or more light sources (e.g., incandescent light bulbs, light emitting diodes (LEDs), etc.). In various embodiments, the user interface may include one or more buttons, levers, pressure-sensitive or touch-sensitive regions, knobs, and/or dials. The user interface may additionally or alternatively include one or more displays and/or indicators. In various embodiments, the user interface may be configured to change an operable state (e.g., on/off). In various embodiments, the user interface may be configured to enable changing at least one of an intensity, tone, or color of light emitted from the light fixture.

The user interface may be coupled to a controller within the lighting assembly, which may be configured to control the light fixture. The user interface may include a power input, which is configured to turn the light fixture on or off. The user interface may further include one or more intensity inputs (e.g., plus or minus indicators) to facilitate changing a brightness, tone, and/or intensity of the light emitted from the light fixture. In various embodiments, the user interface may include selection inputs (e.g., arrows) to facilitate selecting or changing a tone or color of the light emitted from the light fixture. In various embodiments, the lighting assembly may further include a power source (e.g., battery), which is configured to power the light fixture and/or the controller and user interface.

In various embodiments, the lighting assembly may be removably coupled to the bottom surface of the bath caddy tray. In various embodiments, the lighting assembly may include one or more magnetic components, wherein the magnetic components enable coupling of the lighting assembly to the bottom surface of the tray. In various embodiments, the lighting assembly may include one or more permanent magnets disposed therein. In other embodiments, the lighting assembly may be contained within an enclosure, wherein the enclosure comprises one or more magnetic materials. In some embodiments, the lighting assembly may include one or more engaging components that are configured to engage with one or more receiving features within the bottom surface of the bath caddy tray. In various embodiments, the lighting assembly may include one or more extended features, which may be configured to engage with and slide within one or more corresponding tracks disposed within the bottom surface of the tray. In various embodiments, at least one of the light fixture, power source, and user interface may be integrally formed within the bottom surface of the bath caddy tray.

In various embodiments, the lighting assembly may be configured to provide white light. In various embodiments, the lighting assembly may be configured to provide a full color spectrum of light.

In various embodiments, the controller within the lighting assembly may operate according to one or more predetermined modes, which may be chosen and/or modified using at least one of the power input, intensity inputs, or the selection inputs of the user interface. In various embodiments, the one or more predetermined modes may include warm or cool lighting options. In other embodiments, the one or more predetermined modes may be a color theme or journey. In various embodiments, the color theme or journey may determine a selection of colors to be emitted by the light fixture. In various embodiments, the color theme or journey may correspond to one or more ambiances including, but not limited to, a sunset by a lake, a sunrise on an ocean, a walk in a forest, a stroll through a floral garden, etc. In various embodiments, the color theme or journey may correspond to one or more selected moods including, but not limited to, unwinding, reviving, reflecting, escaping, etc.

Turning now to the figures and referring specifically to FIG. 1, a top view of an illuminated bath caddy 100 is shown within a bathing environment 10, according to an exemplary embodiment. As shown, the illuminated bath caddy 100 is configured to adapt to a bathtub 15 within the bathing environment 10 to provide light therein. As illustrated, the illuminated bath caddy 100 is configured to couple to, rest on, and/or otherwise engage with opposite walls 20 and 25 of the bathtub 15 via corresponding ends 102 and 104, respectively, of the caddy 100.

Figure 2:
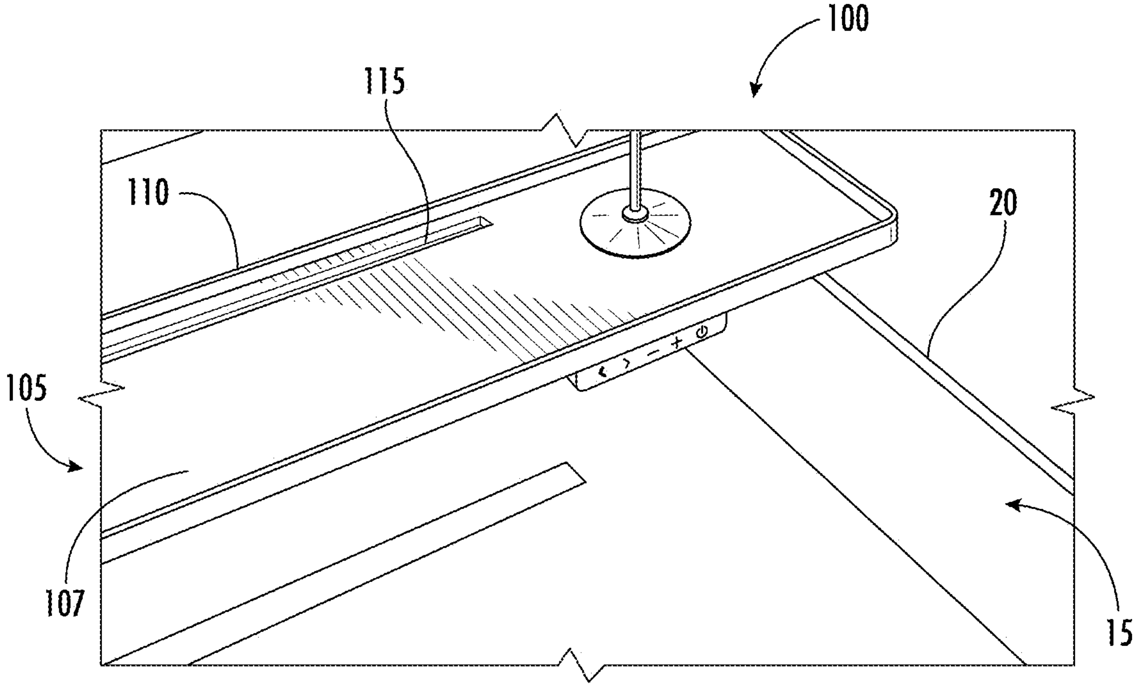
FIG. 2 is a front perspective view of the illuminated bath caddy of FIG. 1.
Figure 3:
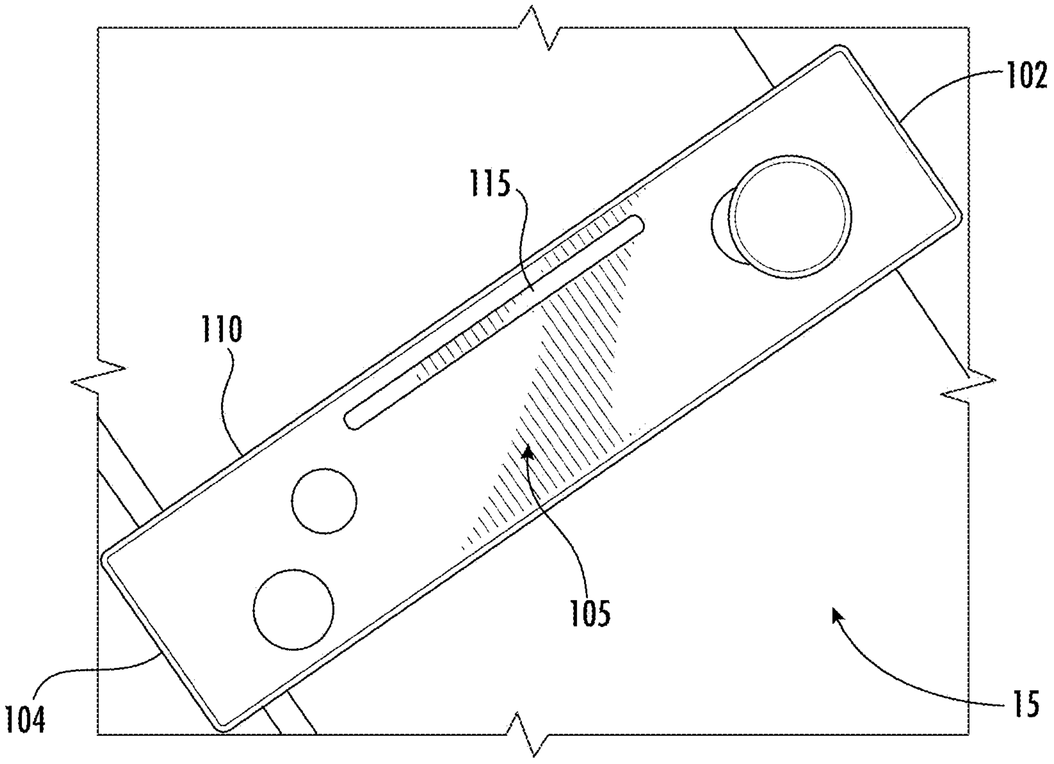
FIG. 3 is a top view of the illuminated bath caddy of FIG. 1 in a bathing environment, according to an exemplary embodiment.

FIGS. 2 and 3 show front perspective and top views, respectively, of the illuminated bath caddy 100, according to various exemplary embodiments. As shown, the illuminated bath caddy 100 includes a tray 105 having a top surface 107, which is configured to enable placement and/or storage of one or more items thereon. The tray 105 may include one or more features to prevent movement or disturbance of the one or more items placed and/or stored on the top surface 107 of the tray 105. In various embodiments, the top surface 107 of the tray 105 may include one or more protruding structures configured to enable containment of items placed on the top surface. The structures may include, but are not limited to, ridges or rims to prevent lateral movement of one or more items placed on the top surface of the tray.

As shown in FIGS. 2 and 3, the tray 10 may include a rim 110, which may be disposed along an outer perimeter of and extending upwardly from at least the top surface 107 of the tray 105 to prevent items disposed thereon from being unintentionally removed from the top surface 107 of the tray 105 (i.e., by falling off an edge of the tray 105). In various embodiments, the rim 100 may be a separate component coupled to the tray 105. In other embodiments, the rim 100 may be integrally formed within the tray 105. In various embodiments, the top surface 107 may additionally or alternatively include one or more ridges and/or high-friction portions to facilitate prevention of lateral movement (e.g., sliding) of items placed on the tray 105. In various embodiments, the top surface 107 may be coated with a high-friction coating or may have one or more high-friction components coupled thereto (e.g., silicone, rubber, etc.). In various embodiments, the top surface 107 of the tray 105 may additionally or alternatively include one or more recesses, which may be configured to contain items placed on the top surface of the tray 105. As shown, the tray 105 may further include one or more recessed regions 115, which may be configured to receive and contain one or more items placed on the tray 105. In various embodiments, the one or more recessed regions 115 may be configured as rectangular slots extending in a direction substantially parallel to a length of the bath caddy 100. In other embodiments, the one or more recessed regions 115 may include circular recesses (e.g., as shown in FIG. 3), which may be configured to receive a beverage container, for example. In yet other embodiments, the one or more recessed regions 115 may include polygonal (e.g., rectangular) recesses configured to receive and retain items stored on the top surface 107. As shown in FIGS. 2 and 3, the illuminated bath caddy 100 is configured to be positioned across a bathtub 15 (i.e., within the bathing environment 10) such that ends 102 and 104 of the illuminated bath caddy 100 respectively engage with opposite walls 20 and 25 of the bathtub 15.

Figure 4A:
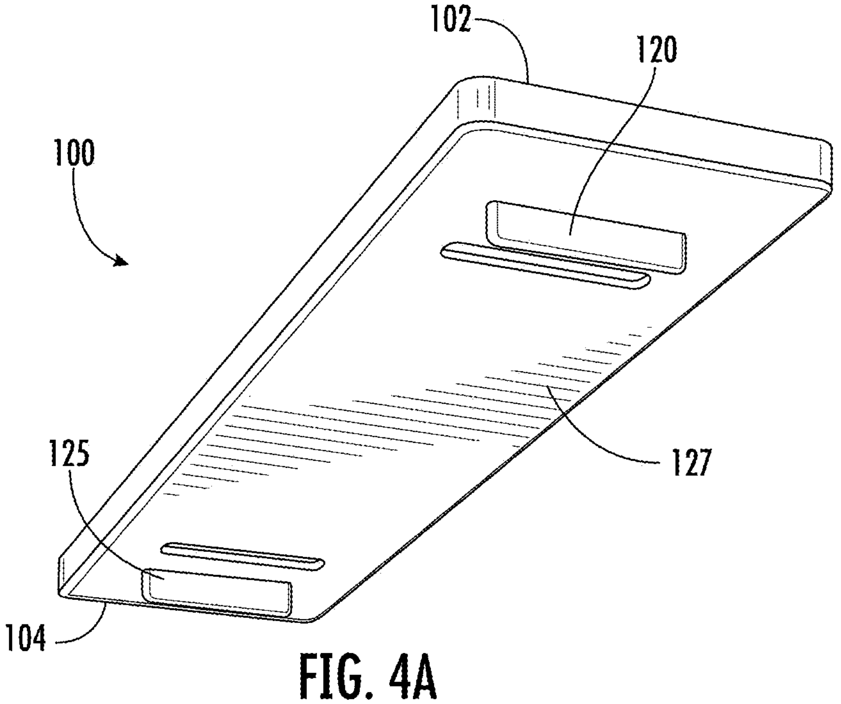
FIG. 4A shows a bottom perspective view of the illuminated bath caddy of FIG. 1, according to an exemplary embodiment.
Figure 4B:
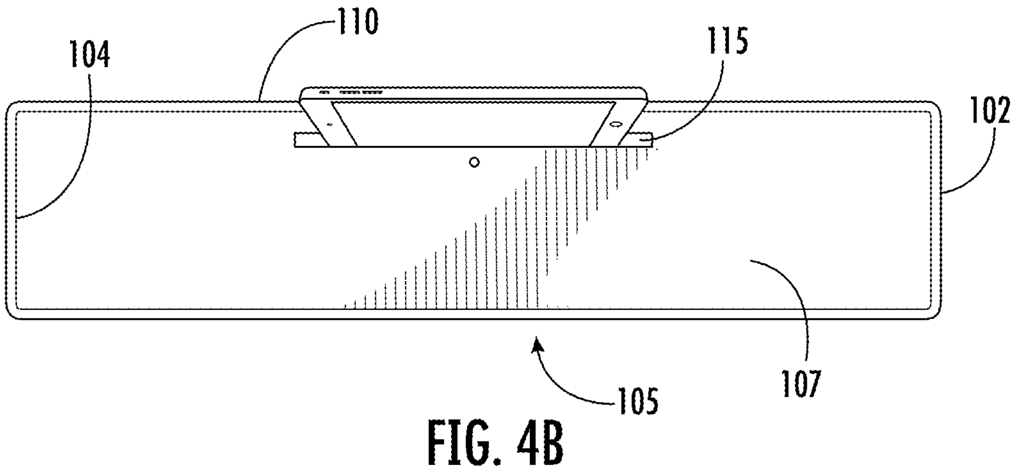
FIG. 4B shows a top view of the illuminated bath caddy of FIG. 1, according to an exemplary embodiment.
Figure 4C:
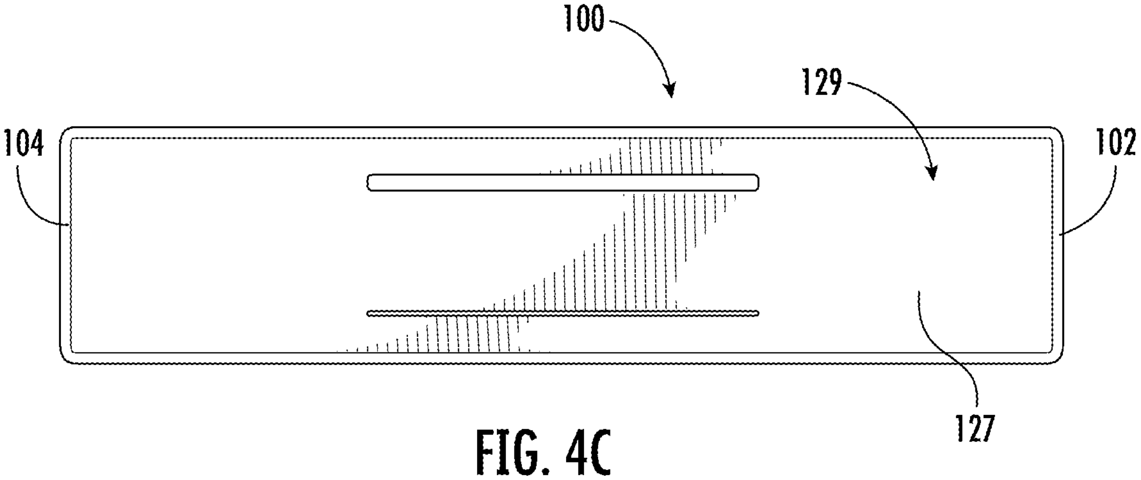
FIG. 4C shows a bottom view of the illuminated bath caddy of FIG. 1, according to an exemplary embodiment.

FIG. 4A shows a bottom perspective view of the illuminated bath caddy 100, according to an exemplary embodiment. As shown in FIG. 4A, the illuminated bath caddy 100 may include placement features 120 and 125, which are configured to fit on and/or over opposite walls of the bathtub 15 (e.g., walls 20 and 25). In some embodiments, the placement features 120 and 125 may form an interference fit with the walls 20 and 25, respectively, which may prevent the illuminated bath caddy 100 from sliding off or otherwise being removed from the bathtub 15. In some embodiments, one or both of the placement features 120 and 125 may be collapsible, such that the placement features 120 and 125 may fold inwardly toward the tray 105. In some embodiments, each of the placement features 120 and 125 may be rectangular (or rounded rectangular), circular or cylindrical, or any other suitable shape. In various embodiments, the placement features 120 and 125 may include one or more coupling components (e.g., clips, clasps, suction cups, etc.) to couple the illuminated bath caddy 100 to the bathtub 15. In other embodiments, the placement features 120 and 125 may include or be coated with one or more high-friction components (e.g., rubber pads, silicone) to prevent the illuminated bath caddy 100 from slipping or sliding relative to the bathtub 15. In various embodiments, the tray 105 may be arranged to maximize functional space on the top surface 107, as illustrated in FIG. 4B. For example, the tray 105 may be configured such that it includes one recessed region 115 configured as a slot disposed parallel to and positioned near the rim 110. Accordingly, a user may insert a book or other object into the recessed region 115 and retain use of a remaining portion of the top surface 107 (e.g., such as for journaling, eating, etc.) In some embodiments, the bottom surface 127 of the illuminated bath caddy 100 may include a non-slip layer or coating 129, as illustrated in FIG. 4C. The non-slip layer 129 may help to prevent the illuminated bath caddy 100 from slipping or moving relative to the bath tub 15. In various embodiments, the non-slip layer 129 may be a rubber or polymer. In other embodiments, the non-slip layer 129 may be a textured layer, which includes ridges, bumps, or other surface contours to prevent slippage.

Figure 5:
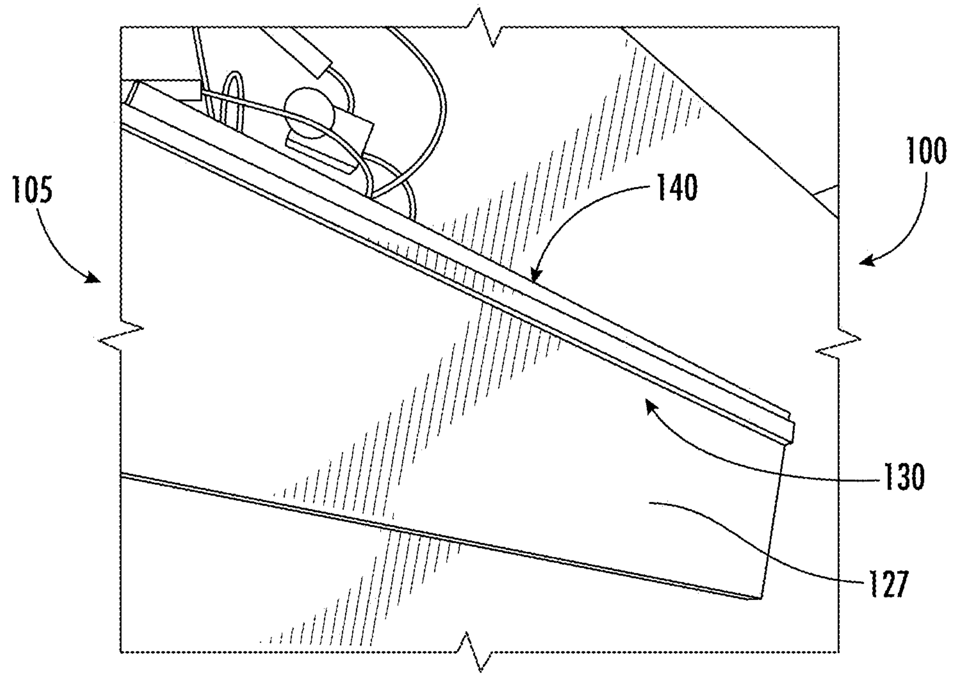
FIG. 5 shows a bottom view of an illuminated bath caddy illustrating a lighting assembly, according to an exemplary embodiment.
Figure 6:
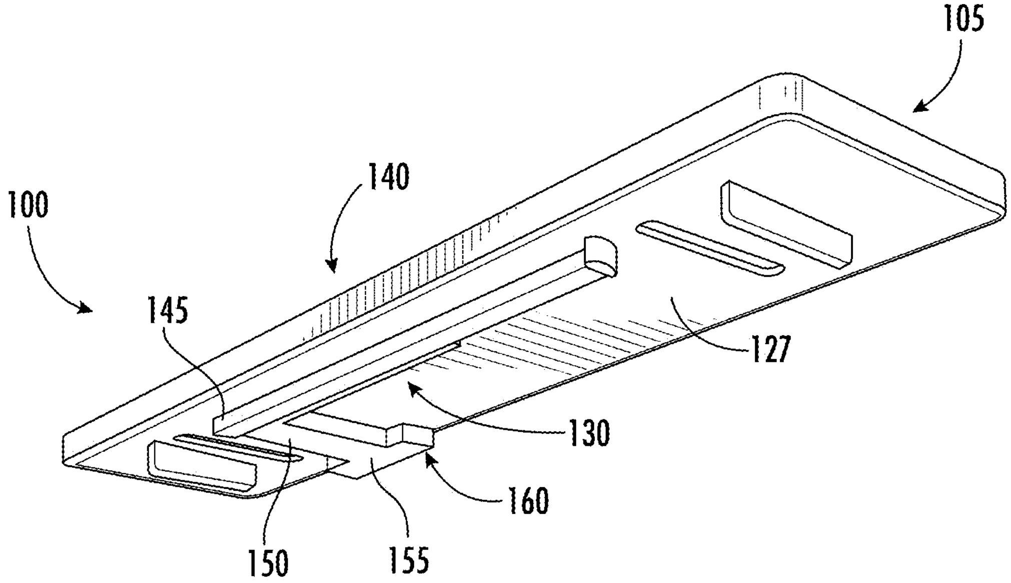
FIG. 6 shows a bottom perspective view of an illuminated bath caddy, illustrating a lighting assembly, according to another exemplary embodiment.

FIGS. 5 and 6 show bottom perspective views of the illuminated bath caddy 100, according to various exemplary embodiments. As shown in FIG. 5, the illuminated bath caddy 100 includes a lighting assembly 130 disposed on a bottom surface 127 of the tray 105 to enable unobtrusive light emission (e.g., no direct light emission to a user's eyes) within the bathing environment 10. In various embodiments, the lighting assembly 130 may be disposed near an edge 140 of the tray 105, where the edge 140 is located opposite a prospective position of a user of the illuminated bath caddy 100. In various embodiments, the lighting assembly 130 may extend along an entire length (or substantially the entire length) of the edge 140, such as shown in FIG. 5. In other embodiments, the lighting assembly 130 may extend along only a portion of the edge 140 (i.e., as shown in FIG. 6). As shown in FIG. 6, the lighting assembly 130 may include a controllable light fixture 145, one or more power sources 150, a controller or control unit 155, and a user interface 160. In various embodiments, the light fixture 145 may include one or more light bulbs and/or light emitting diodes (LEDs). The light fixture 145 may be operably coupled to the one or more power sources 150, which may also be disposed on the bottom surface 127 of the tray 105. In various embodiments, the one or more power sources 150 may include a battery. The light fixture 145 and the one or more power sources 150 may be operably coupled to the controller 155, which is configured to control each of the light fixture 145 and the one or more power sources 150. The controller 155 may be further configured to receive one or more inputs from the user interface 160, which is coupled to the controller 155. In various embodiments, the controller 155 may include a processor and a non-transitory computer readable medium (e.g., a memory device) having computer-readable instructions stored thereon that, when executed by the processor, cause the controller 155 to carry out operations called for by the instructions. In some embodiments, the controller 155 may be a computing device. In other embodiments, the controller 155 may be configured as part of a data cloud computing system configured to receive commands from a user control device and/or remote computing device.

Figure 7:
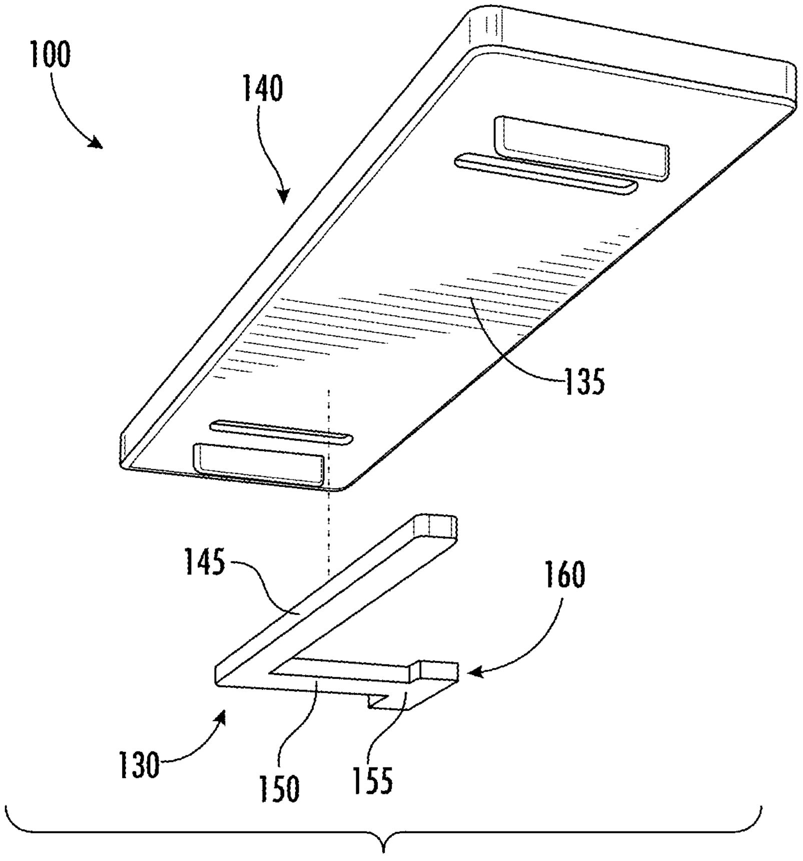
FIG. 7 shows a bottom exploded view of the illuminated bath caddy of FIG. 6, according to an exemplary embodiment.

FIG. 7 shows an exploded bottom perspective view of the illuminated bath caddy 100, according to an exemplary embodiment. As shown, the lighting assembly 130 includes the light fixture 145, one or more power sources 150, controller 155, and user interface 160. In various embodiments, the light assembly 130 and elements included therein may be operably coupled to form a single component therefrom. In various embodiments, the lighting assembly 130 may be removably coupled to the bottom surface 127 of the tray 105. In various embodiments, the lighting assembly 130 may include one or more magnetic components, where the magnetic components enable coupling of the lighting assembly 130 to the bottom surface 127 of the tray 105. In various embodiments, the lighting assembly 130 may include one or more permanent magnets disposed therein to facilitate coupling to the tray 105. In other embodiments, the bottom surface 127 of the tray 105 may include one or more magnetic components (e.g., one or more permanent magnets coupled thereto and/or integrally formed therein), where the one or more magnetic components are configured to enable coupling of the lighting assembly 130 to the tray 105. In other embodiments, the lighting assembly 130 may be contained within an enclosure, where the enclosure includes one or more magnetic materials. In various embodiments, the lighting assembly 130 may be decoupled from the tray 105 to enable maintenance and/or replacement of the power supply 150 (e.g., battery replacement, battery charging), the light fixture 145 (e.g., lightbulb or LED replacement), the controller 155, and/or the user interface 160.

Figure 8:
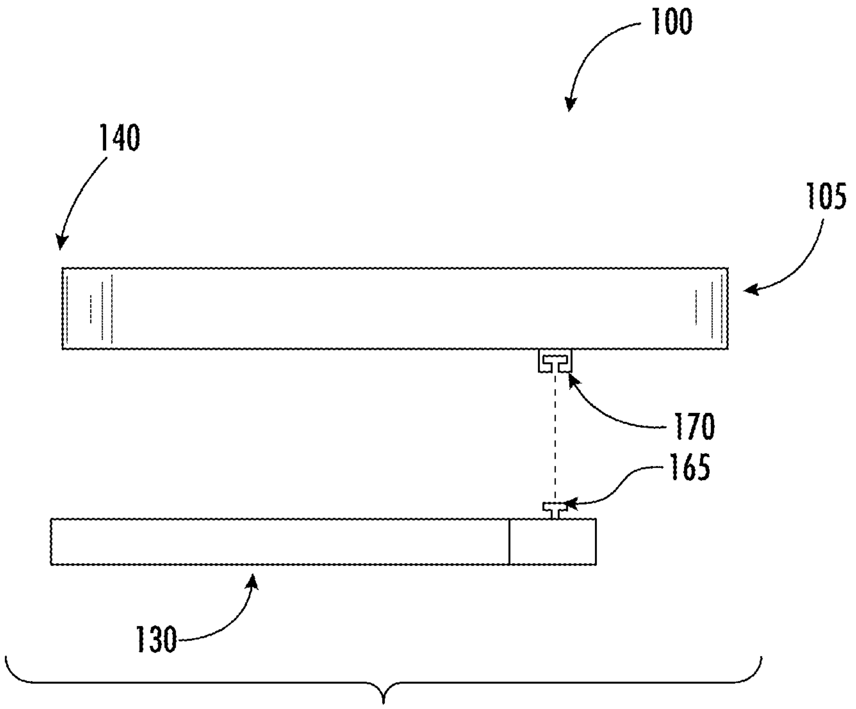
FIG. 8 shows an exploded side view of the illuminated bath caddy of FIG. 6, according to an exemplary embodiment.

FIG. 8 shows a side exploded view of the illuminated bath caddy 100, according to an exemplary embodiment. In some embodiments, the lighting assembly 130 may include one or more engaging components 165 (e.g., protrusions, pegs, posts, brackets, etc.) extending upward from the lighting assembly, which are configured to engage with one or more receiving components 170, such as a bracket, (e.g., to form an interference fit) disposed on or within the bottom surface 127 of the tray 105. In various embodiments, the one or more receiving components 170 may include a track (or ridge, or recess) configured to receive the one or more engaging components 165 such that the lighting assembly 130 may be positioned and coupled to the bottom surface 127 of the tray 105. In other embodiments, the lighting assembly 130 may be configured to snap fit or releasably couple to the bottom surface 127 of the tray 105 via components 165 and 170. In yet other embodiments, the lighting assembly 130 may be integrally formed (e.g., molded) within the bottom surface 127 of the tray 105. In various embodiments, at least one of the light fixture 145, power source 150, controller 155, and user interface 160 may be integrally formed within the bottom surface 127 of the tray 105. In some embodiments, the bottom surface 127 of the tray 105 may include one or more recesses (e.g., slots), which are configured to receive the engaging components 165 of the lighting assembly 130.

Figure 9A:
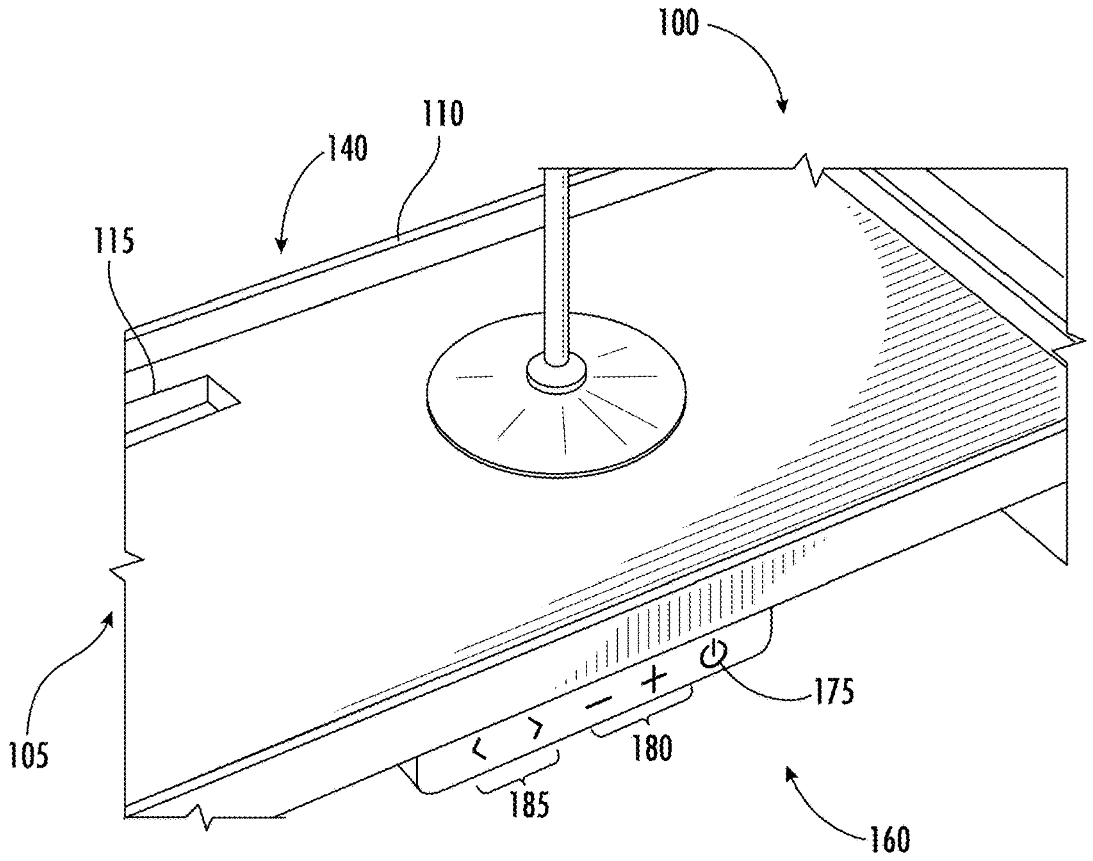
FIG. 9A is a perspective view of an illuminated bath caddy near a user interface, arranged in a first configuration, according to an exemplary embodiment.
Figure 9B:
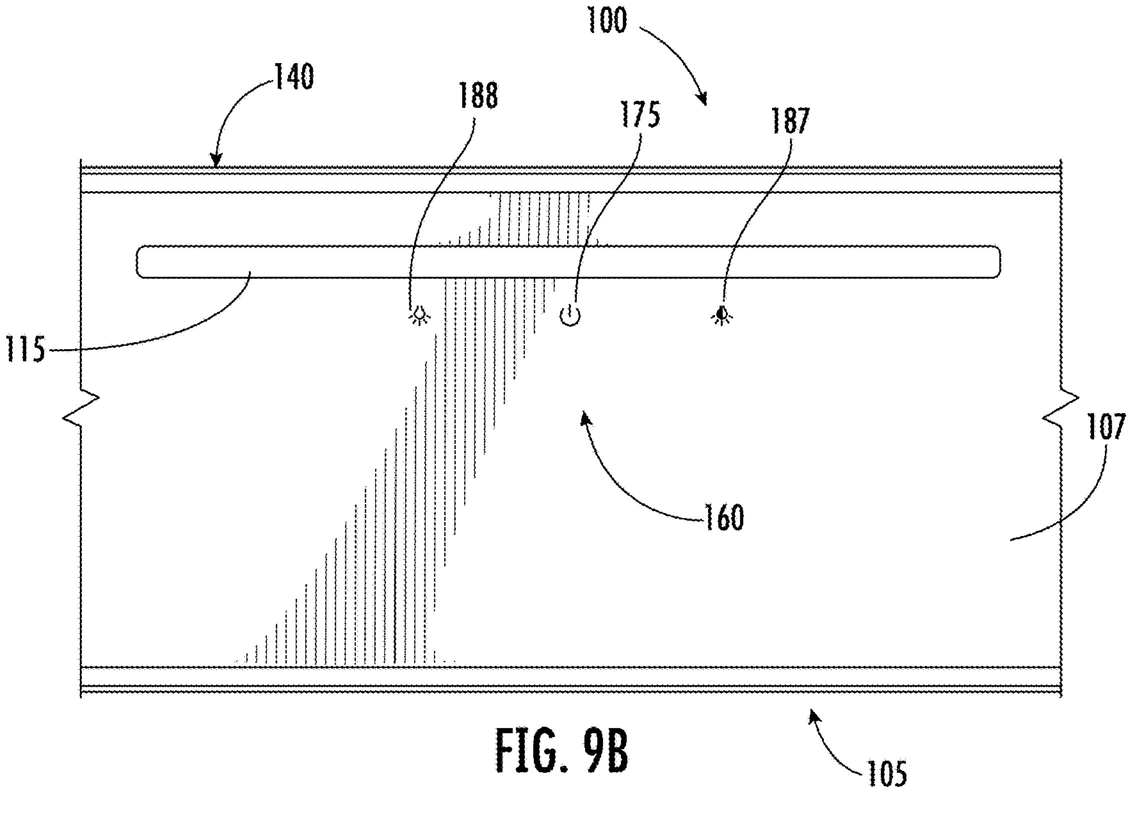
FIG. 9B is a perspective view of an illuminated bath caddy near a user interface arranged in a second configuration, according to an exemplary embodiment.

FIG. 9A shows a perspective view of the illuminated bath caddy 100, according to an exemplary embodiment. In various embodiments, the illuminated bath caddy 100 may include a user interface 160 disposed on the bottom surface 127 of the tray 105. The user interface 160 may be coupled to the controller 155 within the lighting assembly 130, which may be configured to control the light fixture 145. The user interface 160 may include a power input 175, which may be configured to change an operational state of the light fixture 145 (e.g., turn on/off). The user interface 160 may further include one or more intensity inputs 180 (e.g., plus or minus indicators), which may be configured to change a brightness, tone, and/or intensity of the light emitted from the light fixture 145. The user interface 160 may further include one or more selection inputs 185 (e.g., arrows), which may be configured to select and/or change a tone (e.g., warmer, cooler, etc.) and/or color of the light emitted from the light fixture 145. In various embodiments, at least one of the power input 175, the one or more intensity inputs 180, and the selection inputs 185 may include one or more buttons, levers, touch-sensitive regions, knobs, and/or dials. In various embodiments, the user interface 160 may additionally or alternatively include one or more displays and/or indicators. In various embodiments, the lighting assembly 130 may be configured to provide white light within the bathtub 15 in the bathing environment 10. In various embodiments, the lighting assembly 130 may be configured to provide a full color spectrum of light. In various embodiments, the user interface 160 may be disposed on the top surface 107 of the illuminated bath caddy 100. As shown in FIG. 9B, which illustrates a top view of the illuminated bath caddy 100, the user interface 160 may be disposed on the top surface 107 of the tray 105, such as near the recessed region 115. The user interface 160 may include the power input 175 and one or more controls 187 and 188 (e.g., brightness, lighting modes, scenes, etc.).

Figure 10:
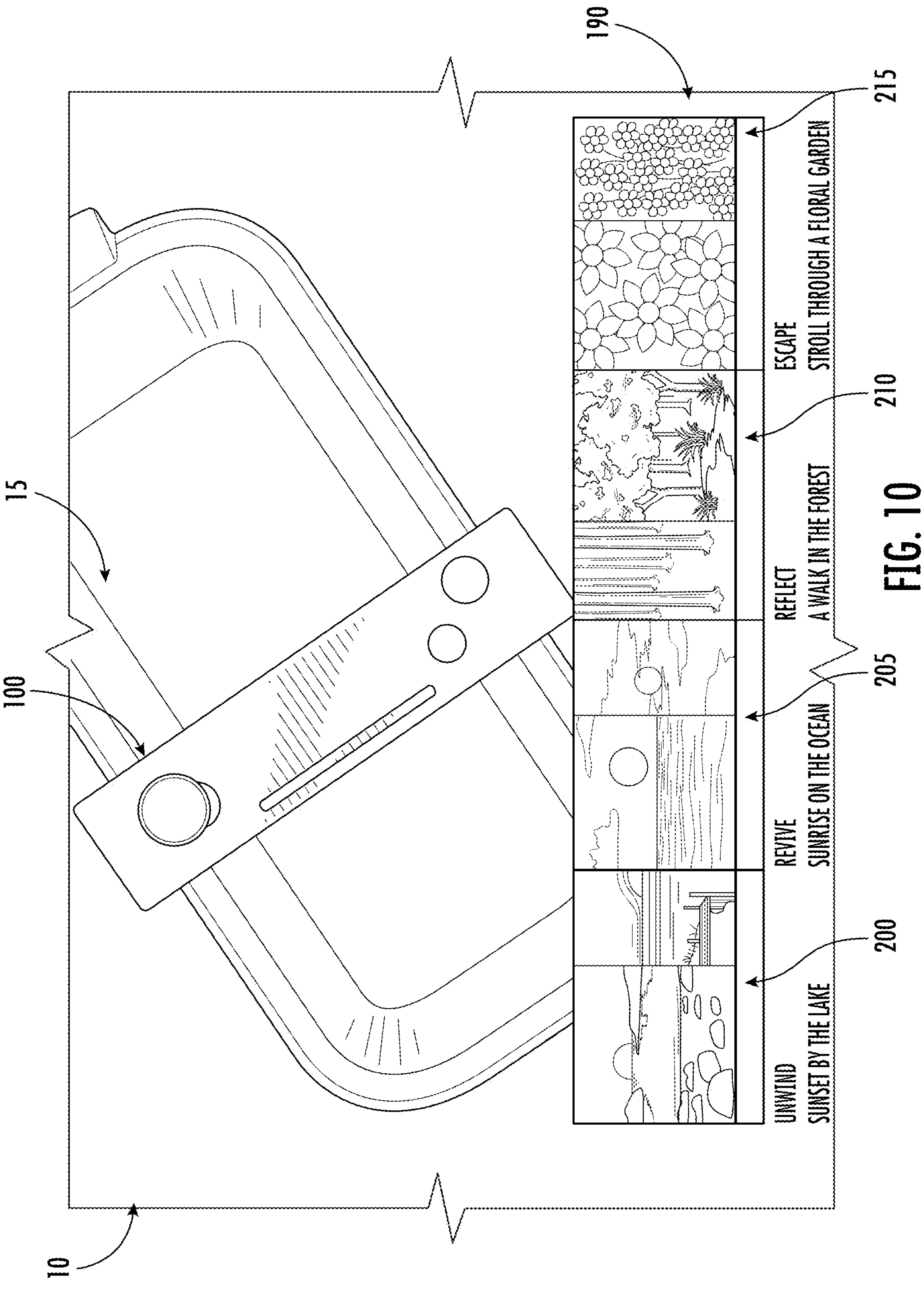
FIG. 10 shows a schematic representation of various mood lighting modes associated with an illuminated bath caddy, according to an exemplary embodiment.

In various embodiments, the controller 155 within the lighting assembly 130 may be configured to operate according to one or more predetermined modes, which may be chosen and/or modified using at least one of the power input 175, intensity inputs 180, or the selection inputs 185 of the user interface 160. In other embodiments, the one or more predetermined modes may be chosen and/or modified using at least one of the power input 175 and the controls 187 and 188. FIG. 10 shows various lighting modes 190 associated with the illuminated bath caddy 100, according to an exemplary embodiment. In various embodiments, the one or more predetermined modes 190 may include warm or cool lighting options, which may be selectable via the selection inputs 185. In other embodiments, the one or more predetermined modes 190 may be a color theme or journey. In various embodiments, the one or more predetermined modes 190 may define a selection of colors to be emitted by the light fixture 145 (e.g., blue, purple, white, etc.). In various embodiments, the one or more predetermined modes 190 may define a sequential order and/or duration for which one or more colors may be emitted by the light fixture 145. In various embodiments, the one or more predetermined modes 190 may correspond to one or more ambiances including, but not limited to, a sunset by a lake 200, a sunrise on an ocean 205, a walk in a forest 210, a stroll through a floral garden 215, etc. In various embodiments, the one or more predetermined modes 190 may correspond to one or more selected moods including, but not limited to, unwinding, reviving, reflecting, escaping, etc. In various embodiments, the one or more predetermined modes 190 may be defined by a user and/or a manufacturer of the illuminated bath caddy 100. In some embodiments, each of the one or more predetermined modes 190 may correspond to a specific light color, tone, and/or intensity.

In various embodiments, the illuminated bath caddy 100 may emit light (e.g., from lighting assembly 130) in various colors, tones, and/or brightness levels depending on the selected mode or ambiance (e.g., a sunset by a lake 200, a sunrise on an ocean 205, a walk in a forest 210, a stroll through a floral garden 215).

In various embodiments, the lighting assembly 130 may be coupled to the tray 105 and the assembled illuminated bath caddy 100 may subsequently be adapted to the bathtub 15 within the bathing environment 110. The power input 175 on the user interface 160 may then be used to turn on the light fixture 145 within the lighting assembly 130. The one or more selection inputs 185 or control inputs 187 and 188 may be used to make a selection from the one or more predetermined modes 190 (e.g., sunset by a lake 200) and a tone and/or brightness may be set via the one or more intensity inputs 180 (or control inputs 187 and 188). The illuminated bath caddy 100 may then emit light, according to the one or more predetermined modes 190, within the bathtub 15 in the bathing environment 10.

Notwithstanding the embodiments described above and shown in FIGS. 1-10, various modifications and inclusions to those embodiments are contemplated and considered within the scope of the present disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A bath caddy comprising:
a tray structured to engage with a bathtub, the tray comprising a surface positioned to face a bottom surface of the bathtub; and
at least one light fixture coupled to the surface of the tray, the at least one light fixture configured to illuminate an interior of the bathtub.

2. The bath caddy of claim 1, wherein the at least one light fixture is coupled to a bottom surface of the tray, the bottom surface facing the interior of the bathtub.

3. The bath caddy of claim 2, wherein the bottom surface is structured to engage with opposing walls of the bathtub.

4. The bath caddy of claim 3, wherein the tray further comprises:
a first placement feature; and
a second placement feature;
wherein each of the first placement feature and the second placement feature are disposed on the bottom surface; and
wherein the first placement feature structured to engage with a first of the opposing walls of the bathtub and the second placement feature structured to engage with a second of the opposing walls of the bathtub.

5. The bath caddy of claim 3, wherein the first placement feature and the second placement feature are structured to form an interference fit with the opposing walls of the bathtub.

6. The bath caddy of claim 3, wherein each of the first placement feature and the second placement feature are configured to fold inwardly toward the bottom surface.

7. The bath caddy of claim 3, wherein each of the first placement feature and the second placement features include one or more coupling components, the one or more coupling components being selected from the list comprising: one or more clips, one or more clasps, and one or more suction cups.

8. The bath caddy of claim 2, wherein the bottom surface includes a non-slip coating configured to prevent movement of the bath caddy relative to the bathtub.

9. A bath caddy comprising:
a surface structured to face a bottom surface of an interior of a bathtub; and
at least one light fixture disposed on the surface and configured to illuminate the interior of the bathtub, the at least one light fixture being an opposing arrangement relative to the bottom surface.

10. The bath caddy of claim 9, further comprising:
at least one controller operably coupled to the at least one light fixture, the at least one controller structured to control operation of the at least one light fixture and
at least one power source operably coupled to and structured to power the at least one light fixture.

11. The bath caddy of claim 10, wherein the at least one controller is configured to control at least one of a color, tone, or brightness of the at least one light fixture.

12. The bath caddy of claim 10, wherein the at least one light fixture, the at least one controller, and at least one power source are included within a lighting assembly coupled to the surface.

13. The bath caddy of claim 12, wherein the lighting assembly is configured to removably couple to the surface.

14. The bath caddy of claim 12, wherein the lighting assembly is configured to removably couple to the surface via one or more magnetic components.

15. The bath caddy of claim 12, wherein the lighting assembly comprises one or more protrusions extending from the lighting assembly, the one or more protrusions configured to be received within corresponding recesses within the surface.

16. The bath caddy of claim 12, wherein the surface comprises one or more brackets, the one or more brackets configured to receive one or more engaging components of the lighting assembly.

17. The bath caddy of claim 12, wherein the lighting assembly is disposed adjacent an edge of the tray.

18. A method of illuminating an interior of a bathtub, the method comprising:
controlling, by a controller, a lighting assembly coupled to a bottom surface of a bath caddy, the lighting assembly configured to illuminate an interior of the bathtub;
wherein the bath caddy comprises a tray structured to engage with the bathtub; and
wherein the bottom surface of the tray faces a bottom surface of the interior of the bathtub.

19. The method of claim 18, wherein controlling the lighting assembly is based on one or more predetermined modes.

20. The method of claim 18, further comprising engaging one or more receiving components of the bottom surface with one or more protrusions of the lighting assembly to couple the lighting assembly to the bottom surface.

* * * * *